United States Patent [19]

Puccinelli et al.

[11] Patent Number: 4,644,438
[45] Date of Patent: Feb. 17, 1987

[54] CURRENT-LIMITING CIRCUIT BREAKER HAVING A SELECTIVE SOLID STATE TRIP UNIT

[75] Inventors: Robert Puccinelli; Didier Fraisse, both of St. Martin d'Heres, France

[73] Assignee: Merlin Gerin, Grenoble Cedex, France

[21] Appl. No.: 613,623

[22] Filed: May 24, 1984

[30] Foreign Application Priority Data

Jun. 3, 1983 [FR] France ............................... 83 09383

[51] Int. Cl.[4] .............................................. H02H 3/07
[52] U.S. Cl. ......................................... 361/75; 361/96
[58] Field of Search ..................... 361/72, 73, 74, 75, 361/92, 93, 96

[56] References Cited

U.S. PATENT DOCUMENTS

| | | | |
|---|---|---|---|
| 3,317,791 | 5/1967 | Price et al. ............................ | 361/73 |
| 3,328,696 | 6/1967 | Schünemann ..................... | 361/72 X |
| 3,375,341 | 3/1968 | Richards ............................ | 361/72 X |
| 3,558,985 | 1/1971 | Krolski et al. ..................... | 361/72 X |
| 3,634,730 | 5/1970 | Wilson ................................ | 361/96 |
| 3,878,436 | 4/1975 | Bogel ................................. | 361/72 |
| 4,084,204 | 4/1978 | Jacobus, Jr. ...................... | 361/72 |
| 4,219,790 | 8/1980 | Batteux et al. ..................... | 335/195 |
| 4,316,230 | 2/1982 | Hansen et al. ..................... | 361/72 |
| 4,454,556 | 6/1984 | DePuy ............................... | 361/73 |

FOREIGN PATENT DOCUMENTS

| | | |
|---|---|---|
| 1563836 | 5/1970 | Fed. Rep. of Germany . |
| 2425153 | 1/1975 | Fed. Rep. of Germany . |
| 1452970 | 9/1966 | France . |
| 1452969 | 9/1966 | France . |
| 2160459 | 6/1973 | France . |
| 2255730 | 7/1975 | France . |
| 2379184 | 8/1978 | France . |

OTHER PUBLICATIONS

Pettinga et al., A Polyphase 500 KA Current Measuring System with Rogowski Coils, IEE Proc. V. 130, Pt B, No. 5, Sep. 1983, p. 360.
Carlson et al., Voltage and Current Sensors for a 1200 KV Gas Insulated Bus, 7th IEEE/Res Trans. and Distr. Conf., Apr., 1979.
"Electronics Revives the Rogowski Coil CT", Electrical Review, V. 216, No. 4, Feb. 1, 1985, p. 22.

*Primary Examiner*—A. D. Pellinen
*Assistant Examiner*—A. Jonathan Wysocki
*Attorney, Agent, or Firm*—Parkhurst & Oliff

[57] ABSTRACT

An electric current-limiting circuit breaker comprises a pair of separable contacts and a selective solid state trip unit including an actuator cooperating with a latch mechanism for actuating the contacts to a positive open position upon occurrence of an overcurrent condition. The movable contact may also be moved by electrodynamic repulsion towards the open position when the fault current exceeds a predetermined threshold to effect current limiting. A tripping control device has an electronic counter which counts successive opening and closing cycles of the contacts so as to trip mechanism after a given number of cycles. The trip unit further comprises a first time delay tripping circuit, and a second instantaneous tripping circuit which cooperates with the cycle counter so as to ensure either instantaneous tripping or tripping by counting up to a number of cycles preselected on a setting selector.

4 Claims, 12 Drawing Figures

4,644,438

CURRENT-LIMITING CIRCUIT BREAKER HAVING A SELECTIVE SOLID STATE TRIP UNIT

BACKGROUND OF THE INVENTION

The invention relates to a selective trip unit associated with a limiting circuit-breaker protecting an alternating current system or installation.

In a trip unit of the kind mentioned, the number of beats or contact opening and closing cycles occurring on a circuit fault is counted and integrated either by a mechanical counter, in particular a cog-wheel moving notch by notch, or by a digital or analog electronic counter. The limiting circuitbreaker is fitted with a standard thermal or thermomagnetic type trip unit.

The association of such an intrinsical trip unit with an electronic counter of the number of successive cycles gives rise to problems of dimensions, as the electronic counter requires specific operation control parts, i.e. a current transformer with two secondary windings, a supply unit, etc... Another technical problem is linked to the operation of the electronic counter which records a pulse or fault current each time the line current exceeds a given threshold, the value of which is lower than the current causing fast opening of the contacts. It has been noted that the peak current intensity of the measurement signal delivered by the current transformer associated with the line to be protected is not the exact image of the effective value of the prospective short-circuit current. Identification of the fault current pulses corresponding to the opening closing cycles of the limiting circuit-breaker contacts is imperfect with such a device, and a faulty or spurious trip can occur as a result.

The object of the present invention is to avoid these drawbacks and to enable a discrimating solid state trip unit to be produced with reduced overall dimensions and a high degree of short-circuit protection reliability whatever the shape and state of the fault current.

SUMMARY OF THE INVENTION

The selective trip unit according to the invention is made up of a detected current powered or so-called current electrode system comprising a first electronic tripping circuit with long time delay LR and/or short delay CR, and a second electronic fast tripping circuit with an operating time lower than that of the first circuit, said cycle counter being inserted in the second circuit to operate in conjunction with a switching unit in order to ensure either instantaneous tripping of the circuit-breaker, or tripping by attaining a predetermined number of cycles displayed by the counter setting means.

It is noted that the counter receives measurement signals from the current sensors common to both the delayed and fast tripping circuits. The long or short delayed tripping circuit comes into action for any overload current or short-circuit current lower than the instantaneous trip threshold. The position of the switching unit enables the fast tripping circuit operating mode to be selected when a high shortcircuit occurs, i.e. instantaneous tripping or tripping by counting the number of cycles.

The switching unit is advantageously made up of a switch electrically connected in parallel to the counter, the counter input and output being connected respectively to an instantaneous trip unit INST, and to a circuit-breaker operating mechanism actuator.

The second fast tripping circuit comprises a resistive divider connected to the output terminals of a rectifier unit associated with the current sensors, the counter input being connected to the mid-point of the resistive divider.

The counter setting means comprise a multiple 1, 2, 3, ... n notch switch preselecting the number of steps or cycles corresponding to the number of fault current pulses, the switch being fitted with an additional 0 notch putting the counter out of circuit for instantaneous tripping operation.

When the current sensors are constituted by current transformers, selectivity of the fault current pulses corresponding to the contacts opening closing cycles is carried out by means of a delayed action detector circuit which inhibits counter operation from the moment the first fault wave is detected, the time delay being variable depending on the shape of the measurement signal delivered to the detector circuit by the current transformer.

A di/dt measurement circuit controls the rise time of the first front of said measurement signal, and operates in conjunction with the detector circuit to ensure a variation of the time delay according to an inverse function of the time derivative of current di/dt.

In the case where the current sensors are constituted by Rogowski type non-ferrous core toroids, the counter comprises a threshold detector circuit which initializes fault current pulse counting after said threshold has been exceeded by the measurement signal from the sensor.

The electronic counter can be analog or digital.

BRIEF DESCRIPTION OF THE DRAWINGS

Other advantages and characteristics will become more clearly apparent from the description that follows of various implementation modes of the invention, given as non-exhaustive examples and represented in the appended drawings in which.

DESCRIPTION OF THE PREFERRED EMBODIMENT

Figure 1:
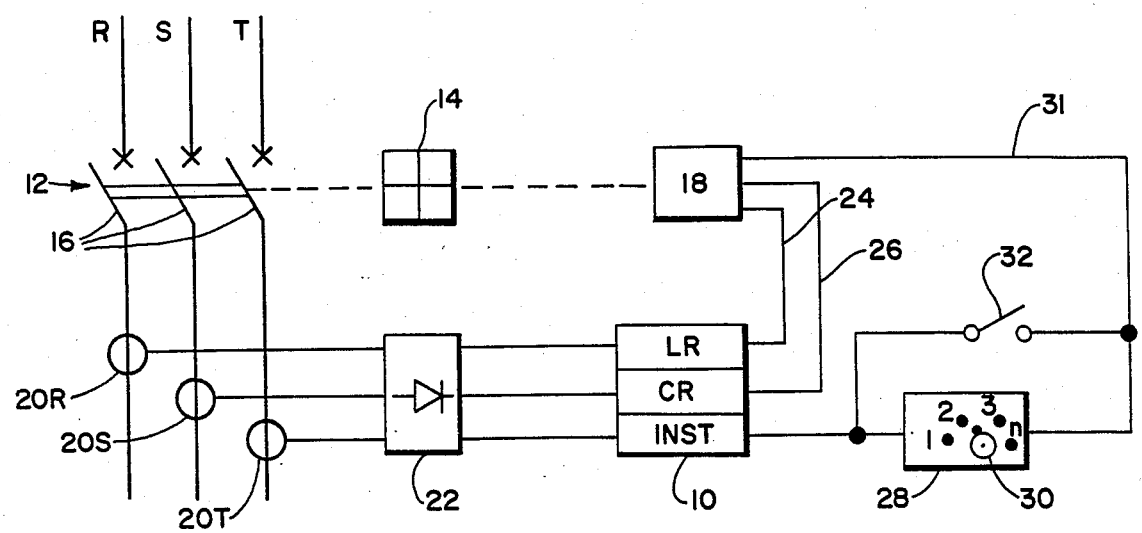
FIG. 1 shows a block diagram of a selective solid state trip unit according to the invention, associated with a limiting circuit-breaker protecting a three-phase installation.

FIG. 1 shows the block diagram of a selective solid state trip unit 10 associated with a current limiting circuit-breaker 12 protecting the line conductors R, S, T, of a three-phase alternating current system. The current limiting circuit-breaker 12 has a trip mechanism 14 controlled by the selective trip unit 10, and fast contact opening and closing means 16 when the value of the fault current is respectively over or under a predetermined threshold. Following a short-circuit, fast opening of contacts 16 is operated spontaneously, independently from circuitbreaker trip operation, so as to form an arc between the contacts as soon as the fault appears, bringing about considerable current limitation. After the current is broken, limiting circuit-breaker 12 contacts 16 close automatically if a trippng command has not been delivered by selective trip unit 10.

Figure 11:
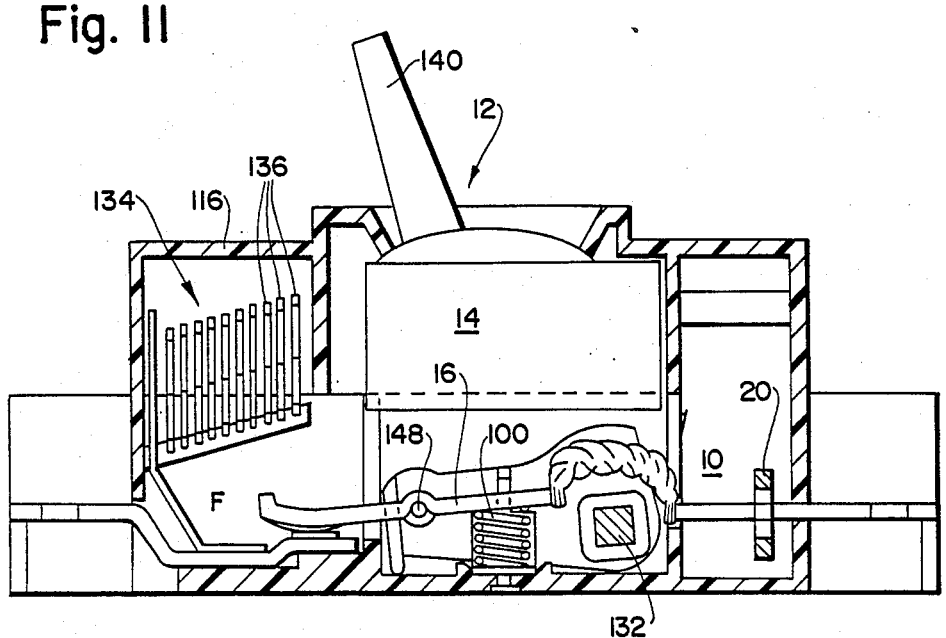
FIGS. 11 and 12 are sectional views of a current limiting circuit breaker.

Current-limiting circuit-breaker 12 can have any structure, the fast opening means of contacts 16 coming into operation in a well-known fashion by electrodynamic or electromagnetic effect. The limiting circuit-breaker can be either single unit equipment integrating the current limiting function, or modular equipment formed by association of a basic circuit-breaker and a current limiting unit in series. Such a circuit breaker shown in FIG. 11 is described in U.S. Pat. No. 4,219,790. The tripping command sent out by the selective trip unit 10 energizes an actuator 18 relay operating in conjunction with a latch operation of tripping mechanism 14. Tripping of mechanism 14 by unlocking the latch confirms circuit-breaker opening. The selective solid state trip unit 10 is of the own current detected current powered type, i.e. without an external power sources, and comprises a first tripping circuit of long time delay LR for protection against overload currents and of short time delay or CR for protection against short-circuit currents, and a second fast tripping circuit comprising an instantaneous trip unit INST. The current intensity flowing in each line conductor R, S, T, of the system is monitored by current sensors 20 R, 20 S, 20 T integrated into the case of the limiting circuit-breaker 12 and fitted downstream from contacts 16. Sensors 20 R, 20 S, 20 T are connected to a rectifier unit 22 designed to supply power and the measurement signal simultaneously to the LR, CR, and INST tripping circuits. The first LR and CR delayed action tripping circuit outputs are directly connected to actuator 18 by two link conductors 24, 26. The second fast tripping circuit is connected to an intermediate electronic counter 28 connected to actuator 18 by a link conductor 31. Counter 28 comprises an electronic fault current pulse processing and counting device corresponding to the successive fast opening and closing cycles of the contacts 16 of the current limiting circuit breaker 12. Counter 28 is fitted with a setting switch 30 to adjust the number of steps to select the number of fault current pulses. Setting switch 30 comprises a plurality of contact plates or notches 1, 2, 3 ... n to preselect the number of steps, and counter 28 transmits the tripping command to actuator 18 when the number of pulses corresponding to the successive opening and closing cycles of contacts 16 is equal to the number of steps displayed by the switch.

The discrimination function can be suppressed by closing a switch 32 which bridges counter 28. The instantaneous tripping circuit INST then operates actuator 18 directly as soon as the current exceeds the instantaneous tripping threshold.

Figure 2:
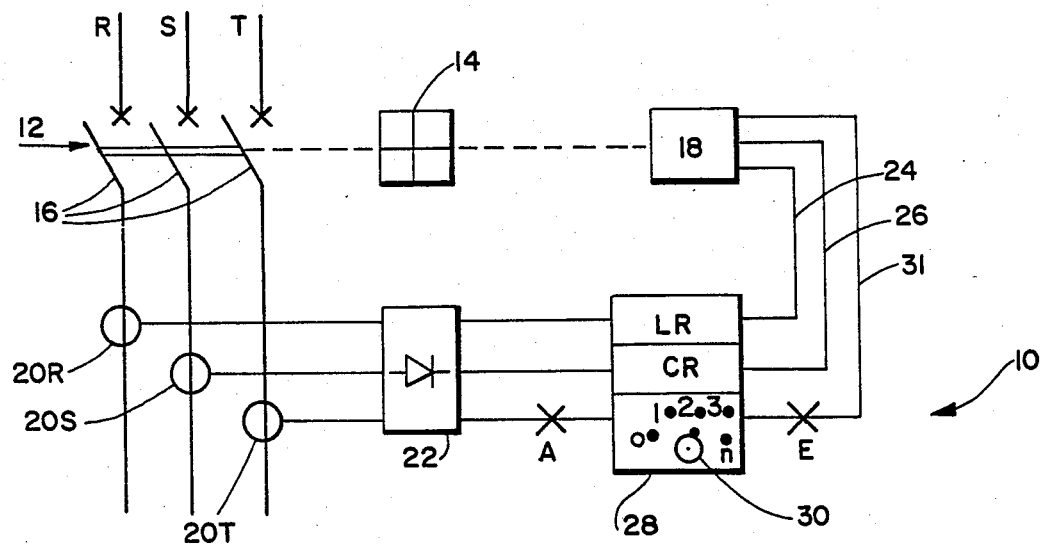
FIG. 2 is a variant of FIG. 1.

FIG. 2 is a varient of FIG. 1, the instantaneous trip unit INST being integrated in the solid state device of counter 28 inserted between rectifier unit 22 and actuator 18. When setting switch 30 is on contact plate 1, counter 28 delivers a tripping command as soon as the first fault current pulse occurs corresponding to a single opening and closing cycle of contacts 16. Setting switch 30 also includes a contact plate 0 which fulfills the role of switch 32 in FIG. 1, ensuring instantaneous tripping.

The operation of the solid state trip unit 1 according to FIGS. 1 and 2 is as follows:

PROTECTION AGAINST OVERLOADS

In the presence of an overload current of an intensity lower than the short time delay tripping threshold, circuit-breaker 12 contacts 16 remain closed until the first long time delay LR tripping circuit comes into action. Actuator 18 receives the command to trip from conductor 24 associated with the LR circuit, and trip mechanism 14 opens contacts 16 after the latch has been unlocked by actuator 18. The other tripping circuits CR and INST, as well as counter 28, remain inactive.

PROTECTION AGAINST SHORT-CIRCUITS

The short time delay CR tripping circuit is sensitive to short-circuit currents with an intensity ranging from the short time delay tripping threshold to the instantaneous tripping threshold. The latter is slightly lower than the maximum dielectric withstand current of limiting circuit-breaker 12, and contacts 16 only open after unlocking of trip mechanism 14 operated by actuator 18 when the order to trip is generated by the CR circuit. Counter 28 remains inactive during this tripping phase.

The current limiting function comes into play for high short-circuit currents flowing through circuit-breaker 12. This results in fast opening of contacts 16 with formation of arcs causing a current limiting effect. The decrease in intensity or disappearance of the limited current then causes contacts 16 to reclose in the event of an order to trip not being transmitted to actuator 18. Counter 28 counts the number of successive opening and closing cycles of contacts 16 directly, and gives actuator 18 the order to trip when the number of cycles is equal to the number of steps displayed by setting switch 30, switch 32 (FIG. 1) being in the opening position. On notch 1, counter 28 transmits the order to trip at the first beat or cycle of contacts 16. On notch 2, the order to trip mechanism 14 occurs on the second beat, and so on up to notch n.

Closing of switch 32 (FIG. 1) bridging counter 28, or setting switch 30 to notch 0 (FIG. 2) bring about instantaneous tripping of mechanism 14 as soon as the short-circuit current intensity exceeds the instantaneous tripping threshold, the order being transmitted to actuator 18 by conductor 31. When switch 32 is open, setting switch 30 to notch 1 causes tripping on the first beat of the contacts.

Following an instantaneous trip or a trip by fault current wave counting, the circuit-breaker 12 tripping time is much lower than when the short time delay CR circuit operates. The tripping time on the first beat of the contacts (notch 1 on setting switch 30) is slightly higher than the instantaneous tripping time.

Figure 3:
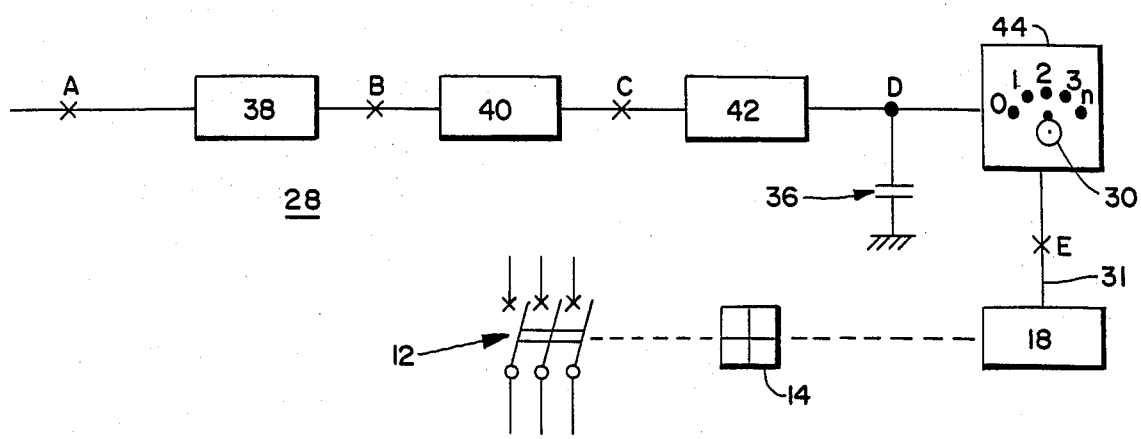
FIG. 3 shows a block diagram of an electronic analog counter incorporated in the trip unit.
Figure 9:
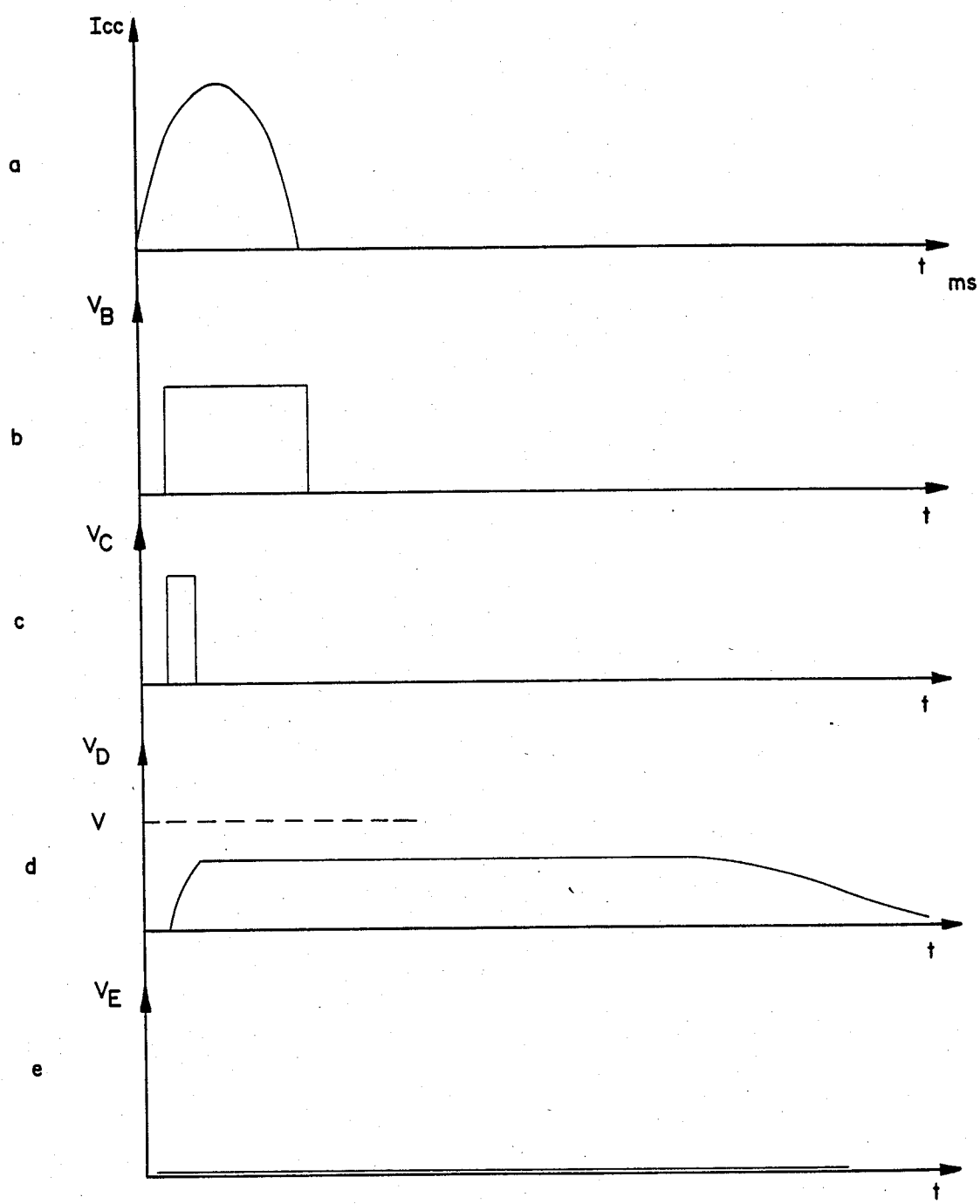
FIGS. 9 and 10 show the chronograms of the signals at different points of the counter according to FIG. 3, respectively on nontripping and tripping of the trip unit, the counter being set at two opening closing cycles.

The cycle counter 28 solid state circuit can be of digital or analog type, and is totally integrated into the circuit-breaker 12 solid state trip unit 10. FIG. 3 shows a production example of an analog counter 28 inserted between points A and E in FIG. 2. Integration of the fault current pulses corresponding to the successive opening and closing cycles of contacts 16 is carried out by gradual loading of a condenser 36. The aspect of the signals at the different points A, B, C, D, E, is shown on FIGS. 9 and 10. The fault signal (see FIG. 9.a) coming from the rectifier unit 22 is processed in a detector circuit 38 designed to deliver an amplitude calibrated pulse (FIG. 9.b) at point B. This pulse is then time calibrated by a calibration circuit 40 comprised of a differentiator followed by a threshold measurement. The measurement calibrated in amplitude and in time (see FIG. 9.c) is sent to an integrator circuit 42 to load the condensor 36 connected between point D and the ground. The voltage (see FIG. 9.d) at the condensor 36 terminals is then applied to one of the comparator 44 inputs, the other input being used to display the tripping threshold by means of setting switch 30. The output voltage (see FIG. 9.e) of comparator 44 is used to operate actuator 18.

Figure 4:
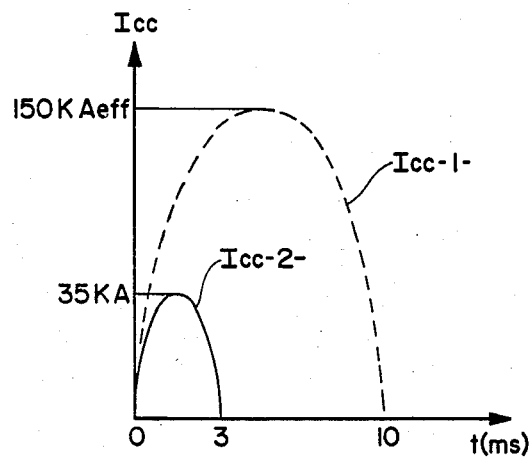
FIGS. 4 and 5 show the diagrams of the current limited (in continuous lines) for different prospective short-circuit current values (in dotted lines)
Figure 5:
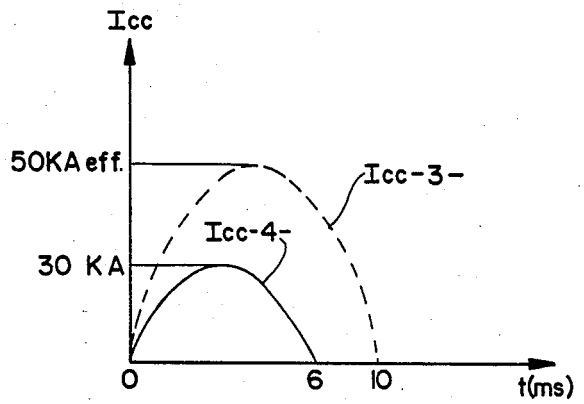

Detection of the fault current pulses that have to be counted by counter 28 (FIG. 3) poses problems of choice of detector circuit 38 depending on the nature of the current sensors 20 R, 20 S, 20 T. FIGS. 4 and 5 show the limited current diagrams (in continuous lines) for two different prospective short-circuit current values (in dotted lines). For example, a prospective current $I_{CC1}$ of 150 kA (FIG. 4) gives a limited current $I_{CC2}$ of 35 kA for 3 ms corresponding to the total breaking time. In another example, in FIG. 5, a prospective short-circuit current $I_{CC3}$ of 50 kA causes a limited current $I_{CC4}$ of 30 kA for 6 ms. The measurement signal delivered to the solid state trip unit 10 by the current transformers is appreciably identical on peak for both limited current $I_{CC2}$ and $I_{CC4}$ values. As a result, the measurement signal peak from the transformers does not correspond to the effective prospective short-circuit current value.

Figure 6:
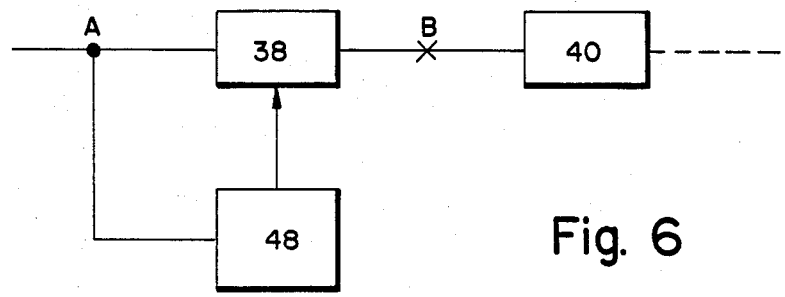
FIG. 6 is a partial view of the counter in FIG. 3, according to a production variant of the invention.

Yet the principle of the system requires a time delay to be introduced that is higher than the breaking time, i.e. the duration of the fault wave corresponding to the limited current $I_{CC2}$ or $I_{CC4}$, and lower than contacts 16 drop-out time. The time delay must therefore be a function of the prospective short-circuit current and must inhibit counter 28 operation from the moment the first fault wave is detected. In FIG. 6, a di/dt measurement circuit 48 monitors the rise time of the first front of the signal delivered by the current transformers, and operates in conjunction with the detector circuit 38 to ensure a time delay variation according to an inverse function of the value di/dt. Indeed, the value di/dt delivered by the current transformers constitutes a significant parameter of the prospective current.

When the current sensors 20 R, 20 S, 20 T, are constituted by Rogowski type non-magnetic toroids directly delivering a measurement signal corresponding to the value di/dt, the detector circuit 38 in FIG. 3 can be a simple threshold circuit. Counter 28 will then begin counting after the current has exceeded the threshold.

Figure 7:
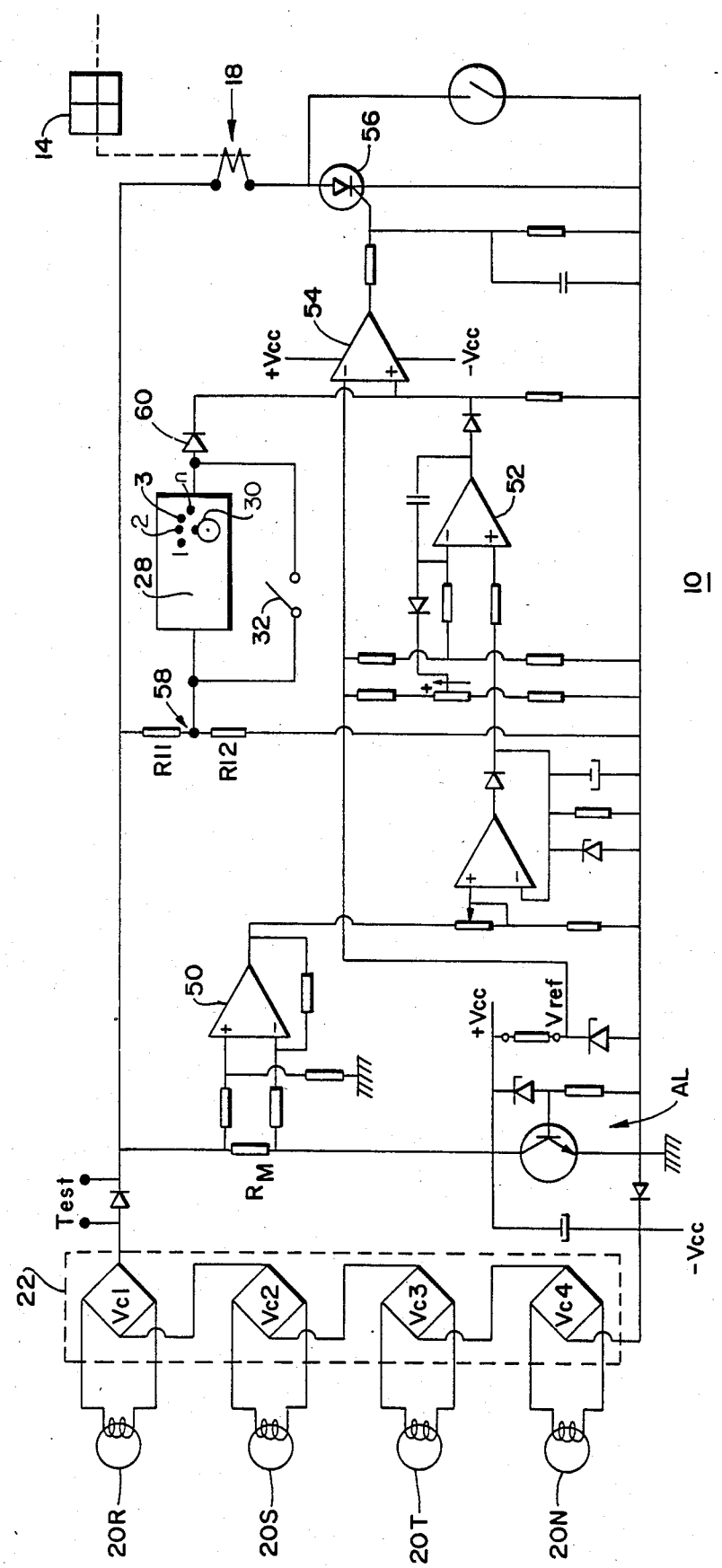
FIG. 7 shows a detailed diagram of the selective solid state trip unit according to the invention associated with a four-pole circuitbreaker.

FIG. 7 shows the detailed diagram of a selective analog solid state trip unit 10, fitted with a fault wave current counter 28. The analog trip unit 10 electronic circuit is similar to that of the device which was the object of U.S. patent application Ser. No. 513,283, filed on July, 13, 1983. Trip unit 10 is associated with a four-pole limiting circuit-breaker comprising current sensors 20 R, 20 S, 20 T, 20 N, whose measurement windings are connected respectively to rectifier unit diode bridges $VC_1$, $VC_2$, $VC_3$, $VC_4$. It is unnecessary to describe the analog tripping circuit in detail, and we will just give a brief reminder that it comprises:

- a measurement resistor $R_M$,
- a power supply circuit AL connected to the rectifier unit 22,
- a shaping circuit 50 connected to the measurement resistor $R_M$ terminals,
- a delayed action trip unit 52 fitted with an analog operator with two threshold voltages to constitute the first and second tripping circuits LR and CR,
- a level detector 54 formed by a differential amplifier,
- a thyristor 56 in series with the actuator 18 operating coil, the thyristor 56 trigger being controlled by the level detector 54.

It is noted that the instantaneous tripping circuit is formed by a resistive bridge $R_{11}$–$R_{12}$ connected directly in parallel to the rectifier unit 22 output. The mid-point 58 of the resistive bridge $R_{11}$– $R_{12}$ is connected to the level detector 54 direct input through counter 28 in series with a diode 60. Counter 28 can be put out of operation by bridging switch 32.

Figure 8:
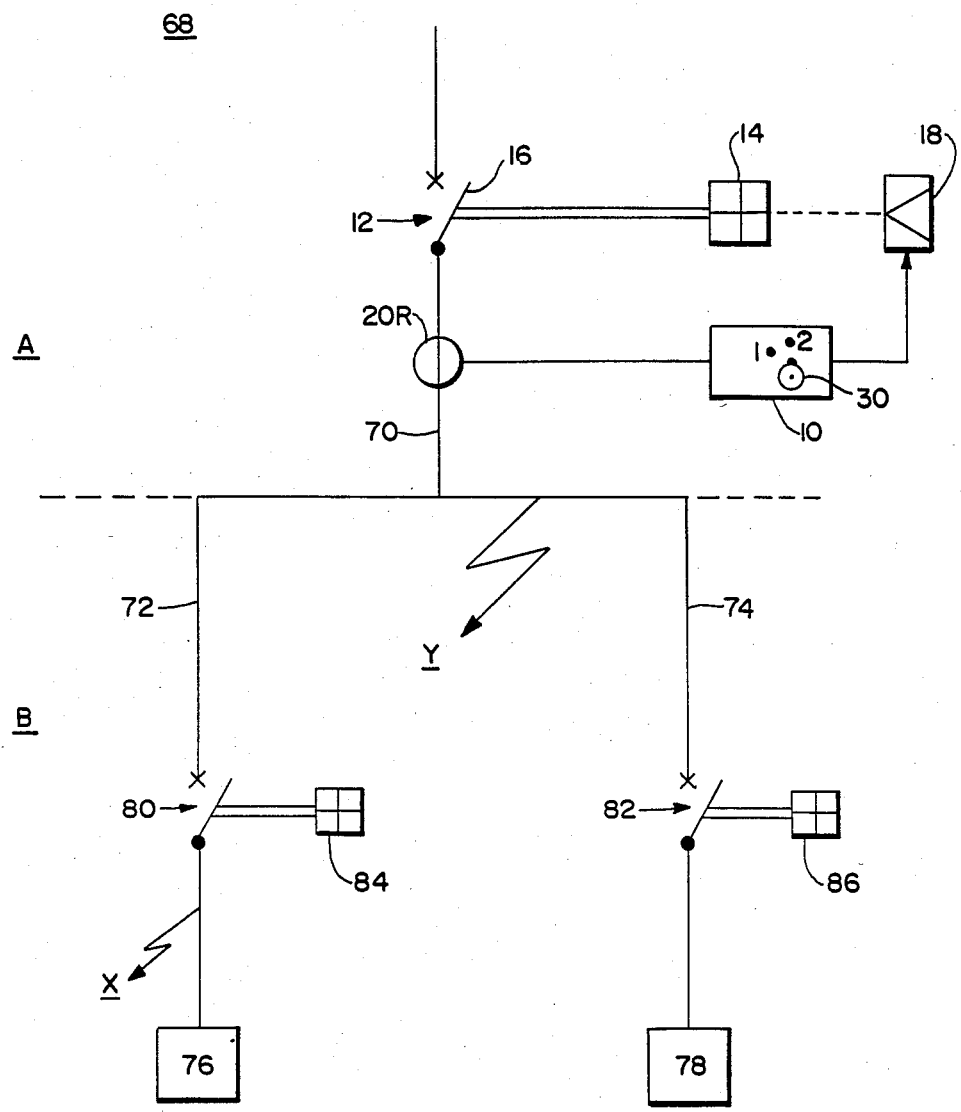
FIG. 8 shows the single-phase diagram of a two-stage distribution installation, fitted with protective device discrimination on shortcircuits.

FIG. 8 shows the single-phase diagram of a two-stage A, B distribution installation supplied by an alternating current source or system (not shown) and fitted with a protective device discrimination system on short-circuits. The upstream stage A, located nearest the source, comprises a main branch 70 in which the limiting circuit-breaker 12 is inserted, fitted with the selective solid state trip unit 10 (FIG. 7) with a counter 28 to count the contacts 16 opening closing cycles on a fault. The downstream stage B comprises as an example two elementary branches 72, 74 supplying loads 76, 78 directly. Each elementary branch 72, 74 is fitted with a protective circuit-breaker 80, 82 whose mechanism 84, 86 is operated either by a standard thermomagnetic or solid state type non-selective trip unit, or by the solid state trip unit 10 in FIG. 7 whose counter is set to notch 1. In the latter case, tripping occurs at the very beginning of the first opening cycle of the contacts and prevents the contacts from closing again. Tripping could be instantaneous with switch 32 in the closed position. Operation of the discrimination system of the protective devices on short-circuits of installation 68 in FIG. 8 is as follows:

The setting switch 30 of counter 28 incorporated in the upstream stage A limiting circuit-breaker 12 selective trip nit 10 is set to notch 2. The counter 28 is the one in FIG. 3, the shape of the signals at the different points A, B, C, D, E being shown in FIGS. 9 and 10.

SHORT-CIRCUIT DOWNSTREAM

In the event of a short-circuit X located between the circuit-breaker 80 and the load 76, the incoming limiting circuit-breaker 12 trip unit 10 counter 28 has recorded a single opening closing cycle of contacts 16, for the fault has been eliminated by the downstream circuit-breaker 80. The operation of counter 28 is illustrated on the chronogram in FIG. 9, and it is noted that the voltage $V_D$ at the condensor 36 terminals (FIG. 3) remains lower than the tripping threshold. Discrimination is achieved due to the non-tripping of the incoming limiting circuit-breaker 12 and the voltage on condensor 36 terminals returns to zero after a predetermined time. This results in automatic zero resetting of counter 28. Circuit-breaker 82 remained closed, and the power supply to the load 78 is maintained.

SHORT-CIRCUIT DOWNSTREAM

Figure 10:
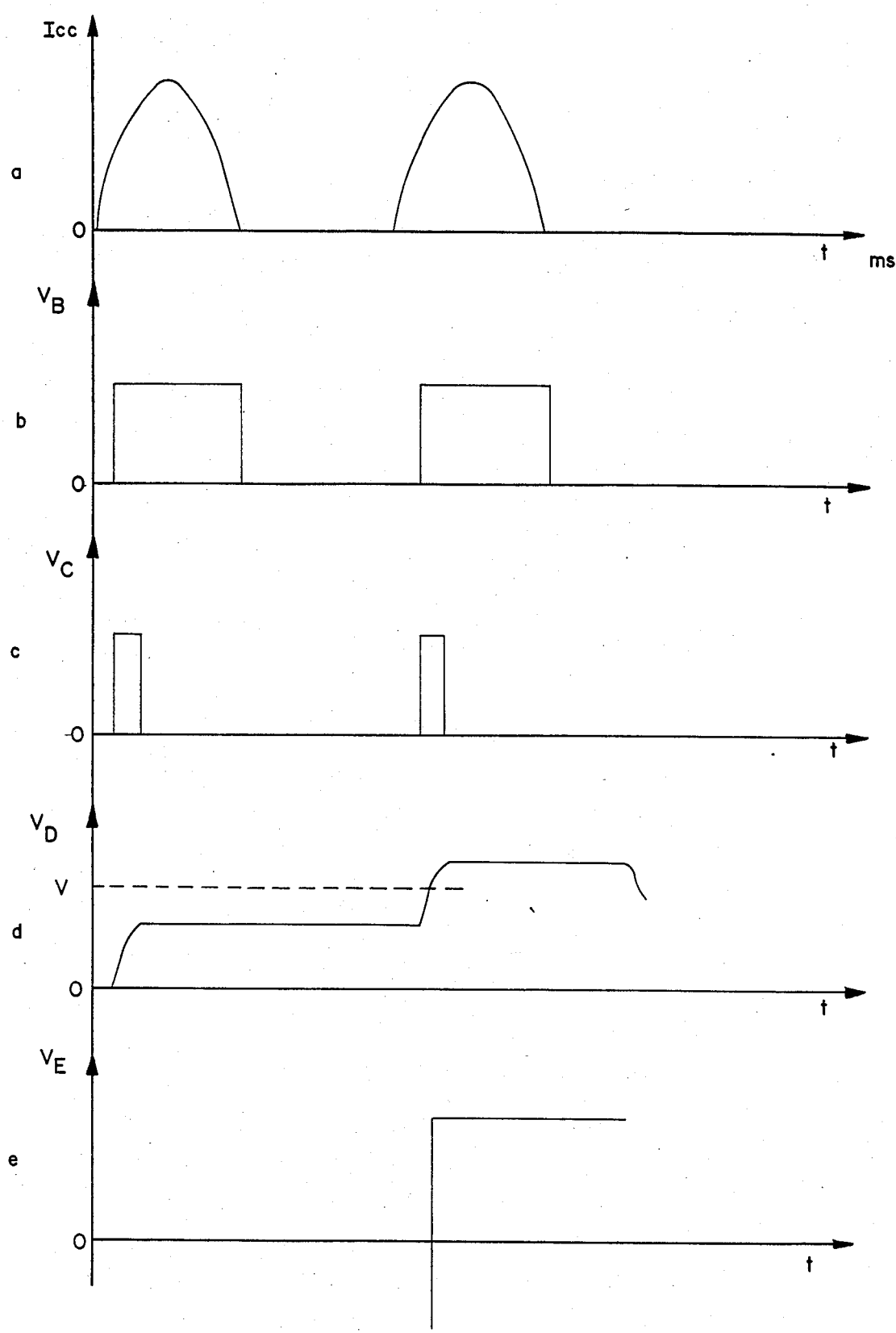

In the event of a downstream short-circuit Y locted between the incoming circuit-breaker 12 and circuit-breakers 80, 82, the stage A limiting circuit-breaker 12 operates two opening closing cycles of contacts 16. This results in two fault current pulses recorded by counter 28. The chronogram in FIG. 10 shows two calibration pulses (see FIG. 10.c) which modify the condensor 36 load. The voltage $V_D$ at the terminals of the latter shows two steps (see FIG. 10.d), the tripping threshold being located between the first and the second step.

Discrimination of protective devices on installation 68 short-circuits thus enables the circuit-breakers to be coordinated in series so as to limit tripping to the circuit-breaker located immediately upstream from the fault only. Discrimination is total with any type of circuitbreaker located at downstream stage B.

CURRENT-LIMITING CIRCUIT BREAKER

Figure 12:
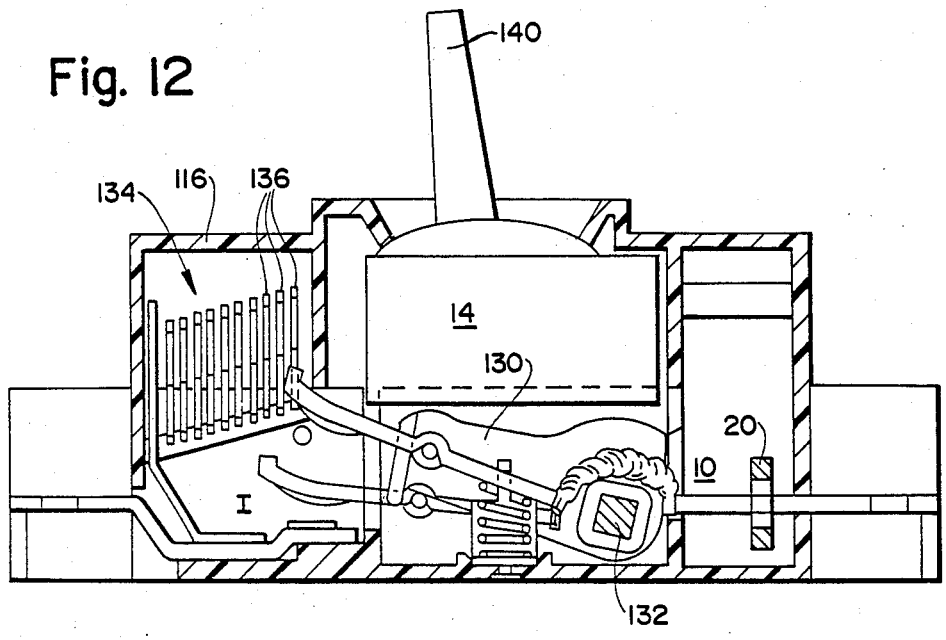

The contact 16 of circuit breaker 12 shown in FIG. 11 and 12 is pinned by a pin 148 to a bracket 130 fixedly secured to a pivotally mounted tie bar 132. The mechanism 14 is manually operated by the handle 140 and is automatically tripped by operation of the trip unit 10. The mechanism 14 actuates the bracket 130 for opening and closing the contact 16. A fast contact opening and closing device, for instance a U-shaped magnetic yoke 100, moves contact 16 into an intermediary opened position I for limiting high short-circuit currents and recloses contact 16 when an order to trip is not transmitted to trip mechanism 14. Circuit breaker 12 has a molded case 116 and an arc extinguishing structure 134 with plates 136.

We claim:

1. A current-limiting circuit breaker having a pair of separable stationary and movable contacts for interconnecting an electrical circuit thereto, an operating latch machanism for opening and closing said separable contacts, a selective trip unit cooperating with an actuator of said mechanism for actuating said contacts in a definitive open position upon occurrence of an overcurrent condition, and additional electrodynamic or electromagnetic means responsive to the value of the current in said circuit for independently actuating said movable contact which is automatically urged towards the open position when the fault current exceeds a first predetermined threshold, and further to the closed position when the fault current falls below said first threshold, so as to define an opening and closing cycle of said contacts, said selective trip unit comprising:

a tripping control device including a cycle counter which counts successive said opening and closing cycle effected by said additional means;

counter setting means cooperating with said cycle counter for incrementing the latter and for supplying a tripping order to said actuator so as to trip said mechanism such that the latter causes a positive opening of the circuit breaker after a selected number of cycles;

zero resetting means for clearing said cycle counter when said succession of cycles is interrupted after supplying of said tripping order;

a first, time-delay solid state tripping circuit connected to said actuator;

a second, instantaneous solid state tripping circuit having an operating time lower than that of said first tripping circuit, and cooperating with said cycle counter so as to ensure instantaneous tripping of said mechanism as soon as the value of the current exceeds a second instantaneous tripping threshold, as well as tripping of said mechanism after counting the selected number of cycles by the counter setting device;

a current sensor including a current transformer; and wherein said counter includes an analog solid state circuit having a delayed action detector circuit which inhibits the operation of the counter from the moment the first fault wave is detected, the time delay being variable depending on the shape of a measurement signal delivered to the detector circuit by said sensor system.

2. A current-limiting circuit breaker according to claim 1, wherein said solid state circuit includes a di/dt measurement circuit which monitors the rise time of the leading edge of said measurement signal, and which operates in conjunction with said detector circuit to ensure that the time delay varies according to an inverse function of the time derivative of the current di/dt.

3. A current-limiting circuit breaker having a pair of separable stationary and movable contacts for interconnecting an electrical circuit thereto, an operating latch machanism for opening and closing said separable contacts, a selective trip unit cooperating with an actuator of said mechanism for actuating said contacts in a definitive open position upon occurrence of an overcurrent condition, and additional electrodynamic or electromagnetic means responsive to the value of the current in said circuit for independently actuating said movable contact which is automatically urged towards the open position when the fault current exceeds a first predetermined threshold, and further to the closed position when the fault current falls below said first threshold, so as to define an opening and closing cycle of said contacts, said selective trip unit comprising:

a tripping control device including a cycle counter which counts successive said opening and closing cycle effected by said additional means;

counter setting means cooperating with said cycle counter for incrementing the latter and for supplying a tripping order to said actuator so as to trip said mechanism such that the latter causes a positive opening of the circuit breaker after a selected number of cycles;

zero resetting means for clearing said cycle counter when said succession of cycles is interrupted after supplying of said tripping order;

a first, time-delay solid state tripping circuit connected to said actuator;

a second, instantaneous solid state tripping circuit having an operating time lower than that of said first tripping circuit, and cooperating with said cycle counter so as to ensure instantaneous tripping of said mechanism as soon as the value of the current exceeds a second instantaneous tripping threshold, as well as tripping of said mechanism after counting the selected number of cycles by the counter setting device;

a current sensor system including a plurality of current transformers; and wherein each current transformer of the current sensor system comprises an induction coil wound upon a non-magnetic toroid form surrounding a current conductor of said electrical circuit, said coil providing a di/dt measurement signal corresponding to the time derivative of current in said conductor, and wherein said cycle counter comprises a threshold detector circuit which commences fault current pulse counting when the measurement signal of said sensor exceeds the threshold of said detector circuit.

4. A circuit breaker according to claim 3 further comprising a calibration circuit connected to the output of said detector circuit;

an integrator circuit having an input terminal connected to the output of said calibration circuit so as to receive amplitude and time calibrated pulses, and an output terminal carrying out the gradual charging of a capacitor; and a comparator having a first input connected to the capacitor and a second input connected to said counter setting device for controlling the tripping threshold.

* * * * *